US008536743B2

(12) United States Patent
Kasuya et al.

(10) Patent No.: US 8,536,743 B2
(45) Date of Patent: Sep. 17, 2013

(54) VEHICLE DRIVE DEVICE

(75) Inventors: Satoru Kasuya, Nishio (JP); Masashi Kitou, Anjo (JP); Yuichi Seki, Okazaki (JP); Yusuke Takahashi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 132 days.

(21) Appl. No.: 13/187,064

(22) Filed: Jul. 20, 2011

(65) Prior Publication Data

US 2012/0032538 A1 Feb. 9, 2012

(30) Foreign Application Priority Data

Aug. 6, 2010 (JP) .................................. 2010-177817

(51) Int. Cl.
*H02K 9/00* (2006.01)
(52) U.S. Cl.
USPC .................. 310/54; 310/52; 310/56; 310/57; 310/58; 310/60 A; 310/60 R; 310/61
(58) Field of Classification Search
USPC ................. 310/52, 54, 57, 58, 60 R, 60 A, 61
See application file for complete search history.

(56) References Cited

U.S. PATENT DOCUMENTS

| | | | | | |
|---|---|---|---|---|---|
| 4,496,862 | A | * | 1/1985 | Weber | 310/56 |
| 5,003,207 | A | * | 3/1991 | Krinickas et al. | 310/52 |
| 7,462,964 | B2 | * | 12/2008 | Nagayama et al. | 310/58 |
| 2003/0030333 | A1 | * | 2/2003 | Johnsen | 310/54 |
| 2004/0124722 | A1 | | 7/2004 | Uchida et al. | |
| 2008/0236952 | A1 | * | 10/2008 | Shimizu et al. | 184/6.22 |
| 2009/0121562 | A1 | * | 5/2009 | Yim | 310/54 |
| 2009/0273246 | A1 | * | 11/2009 | Weiss | 310/61 |
| 2010/0045125 | A1 | * | 2/2010 | Takenaka et al. | 310/54 |
| 2010/0105519 | A1 | | 4/2010 | Kasuya et al. | |
| 2011/0240430 | A1 | * | 10/2011 | Iwase et al. | 192/3.29 |

FOREIGN PATENT DOCUMENTS

| | | |
|---|---|---|
| EP | 2 242 164 A1 | 10/2010 |
| JP | A-2004-215360 | 7/2004 |
| JP | A-2007-107689 | 4/2007 |
| JP | A-2008-07023 | 1/2008 |
| JP | 2009001127 A * | 1/2009 |

(Continued)

OTHER PUBLICATIONS

English translation of Komada et al, Hybrid Driving Device, Jan. 2009, JP 2009001127 A.*

(Continued)

*Primary Examiner* — John K Kim
*Assistant Examiner* — Rohit Singh
(74) *Attorney, Agent, or Firm* — Oliff & Berridge, PLC

(57) ABSTRACT

A rotating electrical machine configured with a rotor and stator. The rotor is rotatably supported radially inside of a stator that has coil end portions on both sides in an axial direction, and which is structured so that oil is supplied from an axial first direction side to the coil end portions on the both sides in the axial direction. A communication oil passage provided in at least one of the rotor and the rotor support member, is configured to communicate with a first opening and a second opening from an oil collecting portion. The first opening opens radially inside the coil end portion on the axial first direction side, and the second opening opens radially inside the coil end portion on an axial second direction side, which is the other side in the axial direction of the rotor.

20 Claims, 6 Drawing Sheets

(56) References Cited

FOREIGN PATENT DOCUMENTS

| JP | A-2009-001127 | | 1/2009 |
|----|----|----|----|
| JP | A-2009-208702 | | 9/2009 |
| JP | A-2010-105450 | | 5/2010 |
| JP | 2008007023 | * | 1/2013 |
| WO | WO 2010/021327 A1 | | 2/2010 |

OTHER PUBLICATIONS

Sep. 27, 2011 International Search Report issued in International Patent Application No. PCT/JP2011/065445 (with translation).

Nov. 15, 2011 Search Report issued in PCT/JP2011/067707 (with translation).

* cited by examiner

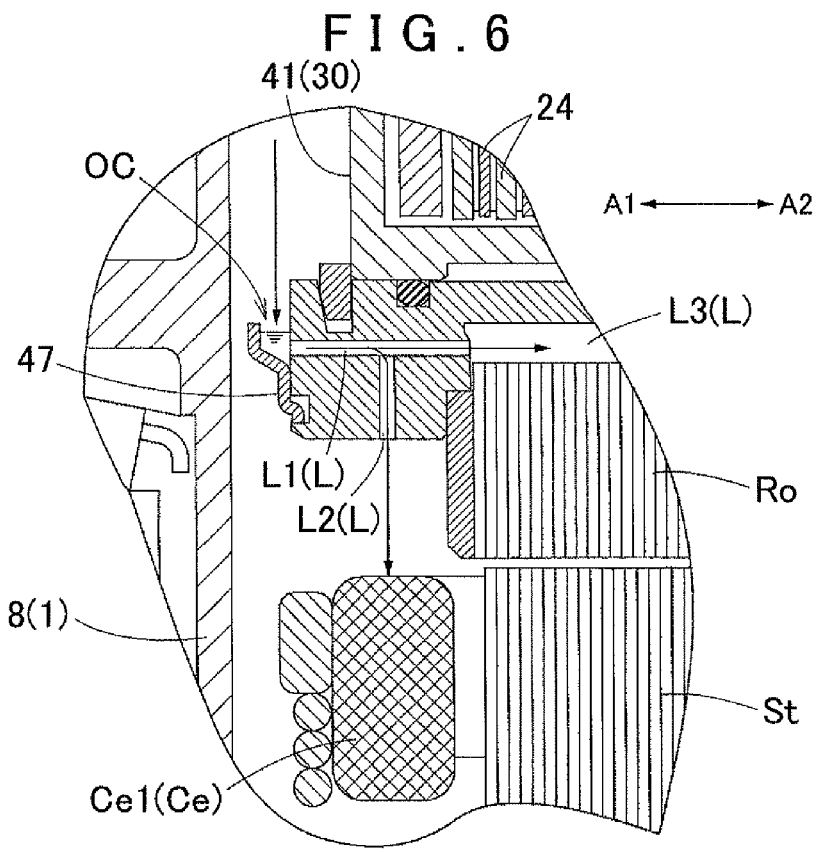
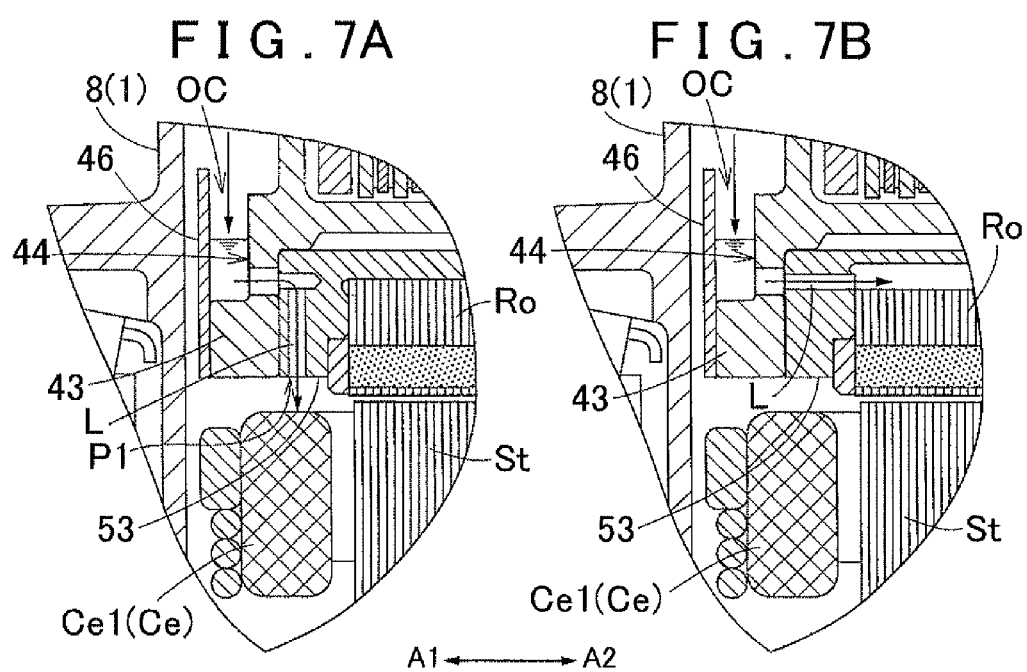

VEHICLE DRIVE DEVICE

INCORPORATION BY REFERENCE

The disclosure of Japanese Patent Application No. 2010-177817 filed on Aug. 6, 2010 including the specification, drawings and abstract is incorporated herein by reference in its entirety.

BACKGROUND OF THE INVENTION

The present invention relates to rotational electrical machines, which include a rotor that is rotatably supported, via a rotor support member, radially inside a stator having coil end portions on both sides in the axial direction, and which are structured so that oil is supplied from an axial first direction side, which is one side in the axial direction of the rotor, to the coil end portions on the both sides in the axial direction, and vehicle drive devices including such a rotational electrical machine.

DESCRIPTION OF THE RELATED ART

A rotational electrical machine described in Japanese Patent Application Publication No. JP-A-2008-007023 below is already known as the rotating electrical machine having such a structure as described above. The rotating electrical machine (a generator motor 2) of Japanese Patent Application Publication No. JP-A-2008-007023 has a recess 10 formed so as to open in one side face 6a located on an axial one direction side of a rotor (6), and has a communication hole 12 communicating a bottom portion 10a of the recess 10 with another side face 6b located on an axial second direction side of the rotor. In this rotational electrical machine, oil is supplied to the recess 10 from a tip end of a nozzle 11 provided on the axial first direction side of the rotor. The oil accumulated in the recess 10 overflows the opening of the recess 10 on the axial first direction side of the rotor, and falls onto a coil end portion (a coil portion 8) on the axial first direction side, which is placed radially outside the recess 10, thereby cooling the coil end portion. The oil accumulated in the recess 10 can also be discharged from the axial second direction side of the rotor through the communication hole 12, and can fall onto a coil end portion on the axial second direction side, which is placed radially outside the recess 10, thereby cooling the coil end portion.

In the rotating electrical machine described in Japanese Patent Application Publication No. JP-A-2008-007023, however, the opening area of the communication hole 12 on the axial second direction side of the rotor is significantly smaller than that of the recess 10 on the axial first direction side of the rotor. Thus, most of the oil accumulated in the recess 10 overflows the opening of the recess 10 on the axial first direction side of the rotor, and the oil is less likely to be supplied to the axial second direction side through the communication hole 12. Accordingly, the cooling oil is less likely to be supplied to the coil end portion on the axial second direction side, and the coil end portion on the axial second direction side may not be sufficiently cooled.

SUMMARY OF THE INVENTION

Thus, it is desired to implement a structure in which it is possible to sufficiently cool the coil end portion on the axial second direction side in addition to the coil end portion on the axial first direction side in the rotational electrical machines structured to supply oil from the axial first direction side of the rotor to the coil end portions.

A rotating electrical machine according to a first aspect of the present invention includes: a rotor rotatably supported, via a rotor support member, radially inside a stator that has coil end portions on both sides in an axial direction, and which is structured so that oil is supplied from an axial first direction side, which is one side in the axial direction of the rotor, to the coil end portions on the both sides in the axial direction; an oil collecting portion provided at an end of the rotor support member located on the axial first direction side; and a communication oil passage provided in at least one of the rotor and the rotor support member, and communicating with a first opening and a second opening from the oil collecting portion, wherein the first opening opens radially inside the coil end portion on the axial first direction side, and the second opening opens radially inside the coil end portion on an axial second direction side, which is the other side in the axial direction of the rotor.

Note that the "rotating electrical machine" is used as a concept including a motor (an electric motor), a generator (an electric generator), and a motor-generator that functions both as the motor and the generator as necessary.

According to the first aspect, the oil that is supplied from the axial first direction side of the rotor can be collected and stored by the oil collecting portion that is provided at the end of the rotor support member on the axial first direction side. The stored oil is ejected from the first opening and the second opening through the communication oil passage provided at least one of the rotor and the rotor support member. At this time, since the flow path cross-sectional area of the communication oil passage that communicates from the oil collecting portion to the first opening and the second opening can be made to be about the same as the opening area of the communication oil passage, the amount of oil ejected from the first opening can be made to be about the same as that ejected from the second opening. Moreover, the first opening and the second opening open radially inside the coil end portions on the axial first direction side and on the axial second direction side, respectively. Accordingly, about the same amounts of oil ejected therefrom are supplied to the coil end portions on the axial first direction side and on the axial second direction side, respectively, whereby these coil end portions can be sufficiently cooled.

Thus, according to the first aspect, in the rotating electrical machine structured so that the oil is supplied from the axial first direction side of the rotor to the coil end portions, the structure in which it is possible to sufficiently cool the coil end portion on the axial second direction side in addition to the coil end portion on the axial first direction side can be implemented.

According to a second aspect of the present invention, the rotor support member may have a cylindrical axially protruding portion that protrudes to the axial first direction side, a recess may be formed so as to be recessed to the axial second direction side with respect to one side end face of the axially protruding portion located on the axial first direction side and open on an inner side in a radial direction, a cover portion may be provided so as to contact and be fixed to the one side end face, and cover the recess on the axial first direction side, and the oil collecting portion may be formed as a pocket-shaped space defined by the recess and the cover member.

According to the second aspect, the oil collecting portion can be formed by a relatively simple structure by using the recess provided in the one side end face of the axially protruding portion, and the cover member that covers the recess on the axial first direction side. Moreover, a region that is occupied by the oil collecting portion can be reduced as compared to, e.g., a structure in which a component that forms the oil collecting portion is separately provided on the end face of the rotor support member located on the axial first direction side. Thus, an increase in overall size of the rotating electrical machine can be suppressed.

According to a third aspect of the present invention, the communicating oil passage may have a common oil passage extending from the oil collecting portion, an oil passage branching from the common oil passage and communicating with the first opening, and an oil passage branching from the common oil passage and communicating with the second opening.

According to the third aspect, the oil passage communicating with the first opening from the oil collecting portion, and the oil passage communicating with the second opening from the oil collecting portion are formed by using the common oil passage portion. This can relatively simplify the overall structure of the communication oil passage. Moreover, in the third aspect, by appropriately structuring the branch portion between the oil passage communicating with the first opening and the oil passage communicating with the second opening, the oil can be evenly distributed to the first opening and the second opening regardless of the oil collection state of the oil collecting portion. Thus, the coil end portions on the axial first direction side and on the axial second direction side can be evenly cooled.

According to a fourth aspect of the present invention, the rotor support member may have a cylindrical inner support portion that supports the rotor from radially inside, and an annular one-side support portion that extends radially outward from the inner support portion and supports the rotor from the axial first direction side, a first oil passage may be formed to extend inside the one-side support portion in the axial direction from the oil collecting portion toward the axial second direction side, a second oil passage may be formed to branch from the first oil passage and extend radially outward inside the one-side support portion, and to communicate with the first opening that opens in an outer peripheral surface of the one-side support portion, and a third oil passage may be formed to extend from the first oil passage further to the axial second direction side, and communicate with the second opening that opens in an end face of the rotor or the rotor support member located on the axial second direction side.

According to the fourth aspect, the communication oil passage, which is structured to have the common oil passage extending from the oil collecting portion and the two oil passages branching from the common oil passage and communicating with the first opening and the second opening, respectively, can be appropriately implemented by the first oil passage, the second oil passage, and the third oil passage. Moreover, the use of the structure in which both the first oil passage and the second oil passage are formed in common in the one-side support portion is advantageous in that processing for forming these oil passages can be relatively easily performed.

According to a fifth aspect of the present invention, the third oil passage may be formed along a joint surface between an inner peripheral surface of the rotor and an outer peripheral surface of the inner support portion.

According to the fifth aspect, the third oil passage can be simply and appropriately formed by processing one or both of the inner peripheral surface of the rotor and the outer peripheral surface of the inner support portion, such as forming a groove that extends in the axial direction.

Moreover, in the fifth aspect, even if the rotor has a plurality of permanent magnets placed so as to be distributed in the circumferential direction and extending along the axial direction, the influence of the third oil passage on a magnetic field formed by the permanent magnets can be reduced.

According to a sixth aspect of the present invention, the rotating electrical machine may further include: an annular rotor holding member that is placed so as to contact the rotor from the axial second direction side, and holds the rotor from the axial second direction side; and a crimped portion that presses the rotor holding member, which is inserted with the inner support portion, from the axial second direction side, and the crimped portion serve as a guide portion that guides the oil, which is supplied from the third oil passage, to the coil end portion.

According to the sixth aspect, the rotor holding member, which is inserted with the inner support portion, can be pressed from the axial second direction side by the crimped portion, and the rotor can be appropriately held on the rotor support member. Moreover, the crimped portion is made to function as the guide portion, whereby the oil supplied from the third oil passage can be efficiently guided to the coil end portions. Thus, the coil end portions can be cooled more efficiently.

According to a seventh aspect of the present invention, the communication oil passage independently may have an oil passage communicating with the first opening from the oil collecting portion, and an oil passage communicating with the second opening from the oil collecting portion.

According to the seventh aspect, since the oil passage communicating with the first opening from the oil collecting portion, and the oil passage communicating with the second opening from the oil collecting portion can be formed independently, the entire communication oil passage can be structured with relatively high flexibility.

A vehicle drive device according to an eighth aspect of the present invention includes: the rotating electrical machine described above; a friction engagement device; and a case accommodating at least the rotating electrical machine and the friction engagement device, wherein the case has a support wall that rotatably supports the rotor support member on the axial first direction side of the rotor, a housing that surrounds the friction engagement device is formed by using at least a part of the rotor support member, and the friction engagement device is placed in a fluid-tight state inside the housing at a position radially inside the rotor, the housing is filled with oil at a predetermined pressure or more, and the support wall is provided with an oil flowing portion through which the oil that is to be supplied to the coil end portions on the both sides in the axial direction flows.

According to the eighth aspect, the friction engagement device is placed inside the housing that is formed by using at least a part of the rotor support portion, and the housing is filled with the oil. Thus, the friction engagement device can be efficiently cooled by this oil.

In the structure in which the housing is in a fluid tight state and is filled with the oil at the predetermined pressure or more, it is difficult to directly guide the oil in the housing radially outward and to use this oil to cool the coil end portions. However, in the eighth aspect, the support wall provided on the axial first direction side of the rotor is provided with the oil flowing portion through which the oil to be supplied to the coil end portions flows. Moreover, the oil collecting portion is provided at the end of the rotor support member located on the axial first direction side. Thus, the oil that has flown through the oil flowing portion can be collected by the oil collecting portion, and can be used to cool the coil end portions on the both sides in the axial direction. Thus, even when the oil in the housing cannot be directly guided radially outward, the coil end portions on both sides in the axial direction can be appropriately cooled.

BRIEF DESCRIPTION OF THE DRAWINGS

FIG. 6 is a cross-sectional view of a main portion, showing an example of a structure of cooling oil passages according to another embodiment; and FIGS. 7A and 7B shows cross-sectional views of a main portion, showing an example of a structure of cooling oil passages according to another embodiment.

DETAILED DESCRIPTION OF THE EMBODIMENT

Figure 1:
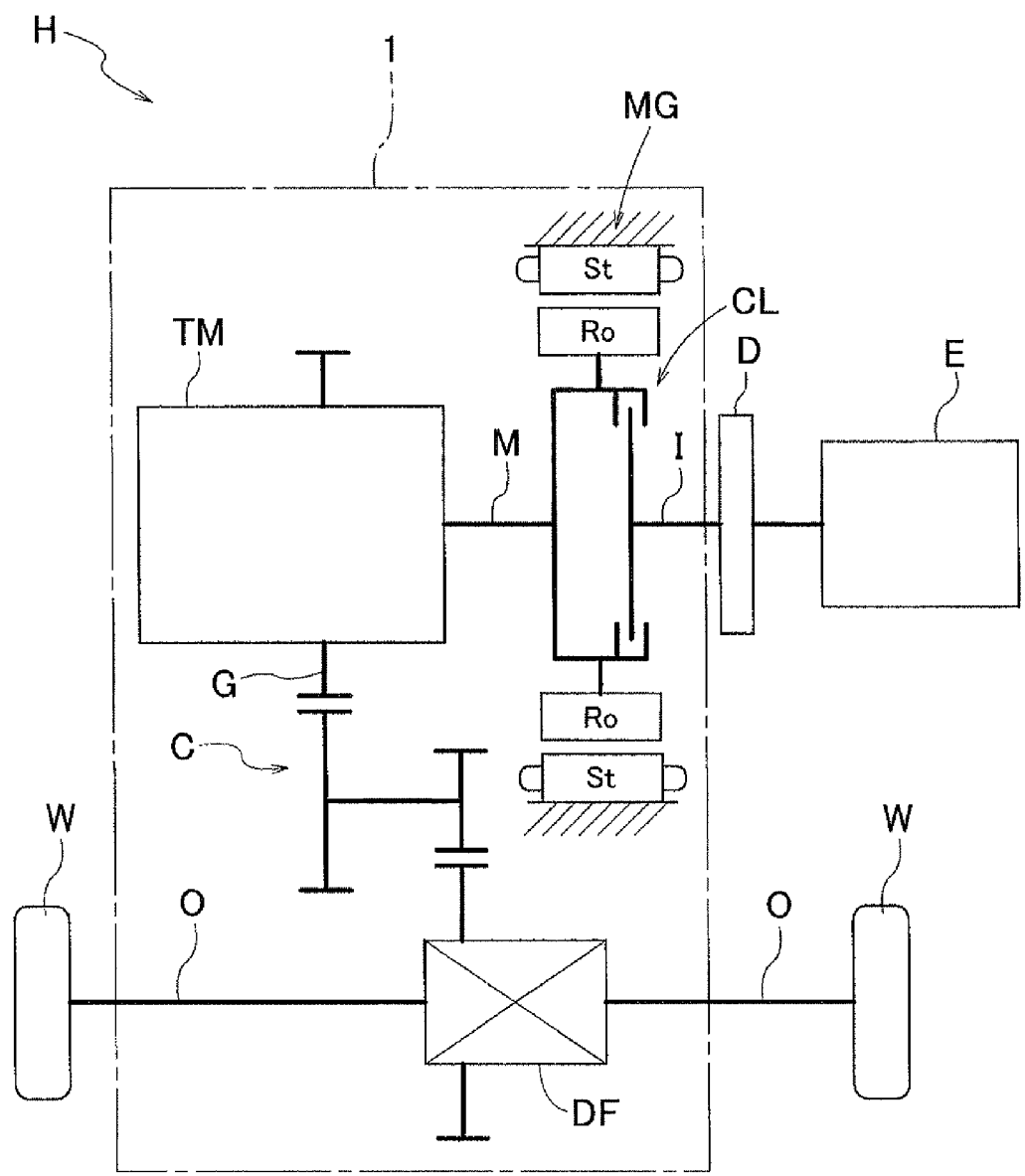
FIG. 1 is a schematic diagram showing a schematic structure of a hybrid drive device according to an embodiment.

An embodiment of the present invention will be described with reference to the accompanying drawings. The present embodiment is described with respect to an example in which a rotating electrical machine of the present invention is applied to a rotating electrical machine that is used as a driving force source of a vehicle in a hybrid drive device. FIG. 1 is a schematic diagram showing a schematic structure of a hybrid drive device H including a rotating electrical machine MG according to the present embodiment. The hybrid drive device H is a drive device for hybrid vehicles, which uses one or both of an internal combustion engine E and the rotating electrical machine MG as a driving force source of the vehicle. The hybrid drive device H is structured as a so-called one-motor parallel type hybrid drive device. The rotating electrical machine MG of the present embodiment, and the hybrid drive device H including the rotating electrical machine MG will be described in detail below.

1. Overall Structure of Hybrid Drive Device

First, the overall structure of the hybrid drive device H of the embodiment will be described below. As shown in FIG. 1, the hybrid drive device H includes: an input shaft I that is drivingly coupled to the internal combustion engine E as a first driving force source of the vehicle; the rotating electrical machine MG as a second driving force source of the vehicle; a speed change mechanism TM; an intermediate shaft M that is drivingly coupled to the rotating electrical machine MG and is drivingly coupled to a speed change mechanism TM; and an output shaft O that is drivingly coupled to wheels W. The hybrid drive device H further includes: a clutch CL provided so as to be able to switch between transmission and interruption of a driving force between the input shaft I and the intermediate shaft M; a counter gear mechanism C; and an output differential gear unit DF. These structures are accommodated in a case (a drive device case) 1.

Note that as used herein, the expression "drivingly coupled" refers to the state in which two rotating elements are coupled together so as to be able to transmit a driving force therebetween, and is used as a concept including the state in which the two rotating elements are coupled together so as to rotate together, or the state in which the two rotating elements are coupled together so as to be able to transmit a driving force therebetween via one or more transmission members. Such transmission members include various members that transmit rotation at the same speed or after changing the speed of the rotation, and for example, include a shaft, a gear mechanism, a belt, a chain, etc. The "driving force" is herein used as a synonym for torque. In the present embodiment, the "axial direction," the "radial direction," and the "circumferential direction" are defined based on a central axis of rotation of the input shaft I, the intermediate shaft M, and the rotating electrical machine MG, which are placed on the same axis.

The internal combustion engine E is a device that is driven by combustion of fuel inside the engine to output motive power. For example, various known engines such as a gasoline engine and a diesel engine can be used as the internal combustion engine E. In this example, an output rotating shaft such as a crankshaft of the internal combustion engine E is drivingly coupled to the input shaft I via a damper D. The input shaft I is drivingly coupled to the rotating electrical machine MG and the intermediate shaft M via the clutch CL, and the input shaft I is selectively drivingly coupled to the rotating electrical machine MG and the intermediate shaft M by the clutch CL. When the clutch CL is in an engaged state, the internal combustion engine E is drivingly coupled to the rotating electrical machine MG via the input shaft I. When the clutch CL is in a disengaged state, the internal combustion engine E is separated from the rotating electrical machine MG.

The rotating electrical machine MG has a stator St and a rotor Ro, and is capable of functioning as a motor (an electric motor) that is supplied with electric power to generate motive power, and as a generator (an electric generator) that is supplied with motive power to generate electric power. Thus, the rotating electrical machine MG is electrically connected to an electricity storage device (not shown). In this example, a battery is used as the electricity storage device. Note that a capacitor, etc. may be used as the electricity storage device. The rotating electrical machine MG is supplied with electric power from the battery to perform power running, or supplies output torque of the internal combustion engine E or electric power generated by an inertial force of the vehicle to the battery to accumulate the electric power therein. The rotor Ro of the rotating electrical machine MG is drivingly coupled to the intermediate shaft M so as to rotate together therewith. The intermediate shaft M is an input shaft (a speed change input shaft) of the speed change mechanism TM.

The speed change mechanism TM is a device that changes the rotational speed of the intermediate shaft M at a predetermined speed ratio to transmit the resultant rotation to a speed change output gear G. In the present embodiment, an automatic stepped speed change mechanism, which is structured to include single-pinion type and Ravigneaux type planetary gear mechanisms and a plurality of engagement devices such as a clutch, a brake, and a one-way clutch, and which includes a plurality of shift speeds having different speed ratios and being switchable therebetween, is used as such a speed change mechanism TM. Note that an automatic stepped speed change mechanism having other specific structure, an automatic continuously variable speed change mechanism capable of continuously changing the speed ratio, a manual stepped speed change mechanism having a plurality of shift speeds having different speed ratios and being switchable therebetween, etc. may be used as the speed change mechanism TM. The speed change mechanism TM changes the rotational speed of the intermediate shaft M at a predetermined speed ratio at each time and converts the torque thereof to transmit the resultant rotation and torque to the speed change output gear G.

The speed change output gear G is drivingly coupled to the output differential gear unit DF via the counter gear mechanism C. The output differential gear unit DF is drivingly coupled to the wheels W via the output shaft O, and distributes and transmits rotation and torque, which are input to the output differential gear unit DF, to the two wheels W, namely the right and left wheels W. Thus, the hybrid drive device H can transmit the torque of one or both of the internal combustion engine E and the rotating electrical machine MG to the wheels W to cause the vehicle to move.

Note that the hybrid drive device H of the present embodiment has a multi-axis structure in which the input shaft I and the intermediate shaft M are placed on the same axis, and the output shaft O is placed on a different axis from that of the input shaft I and the intermediate shaft M so as to extend parallel to each other. Such a structure is suitable for the structure of the hybrid drive device H that is mounted on, e.g., front-engine, front-wheel drive (FF) vehicles.

2. Structure of Each Portion of Hybrid Drive Device

Figure 2:
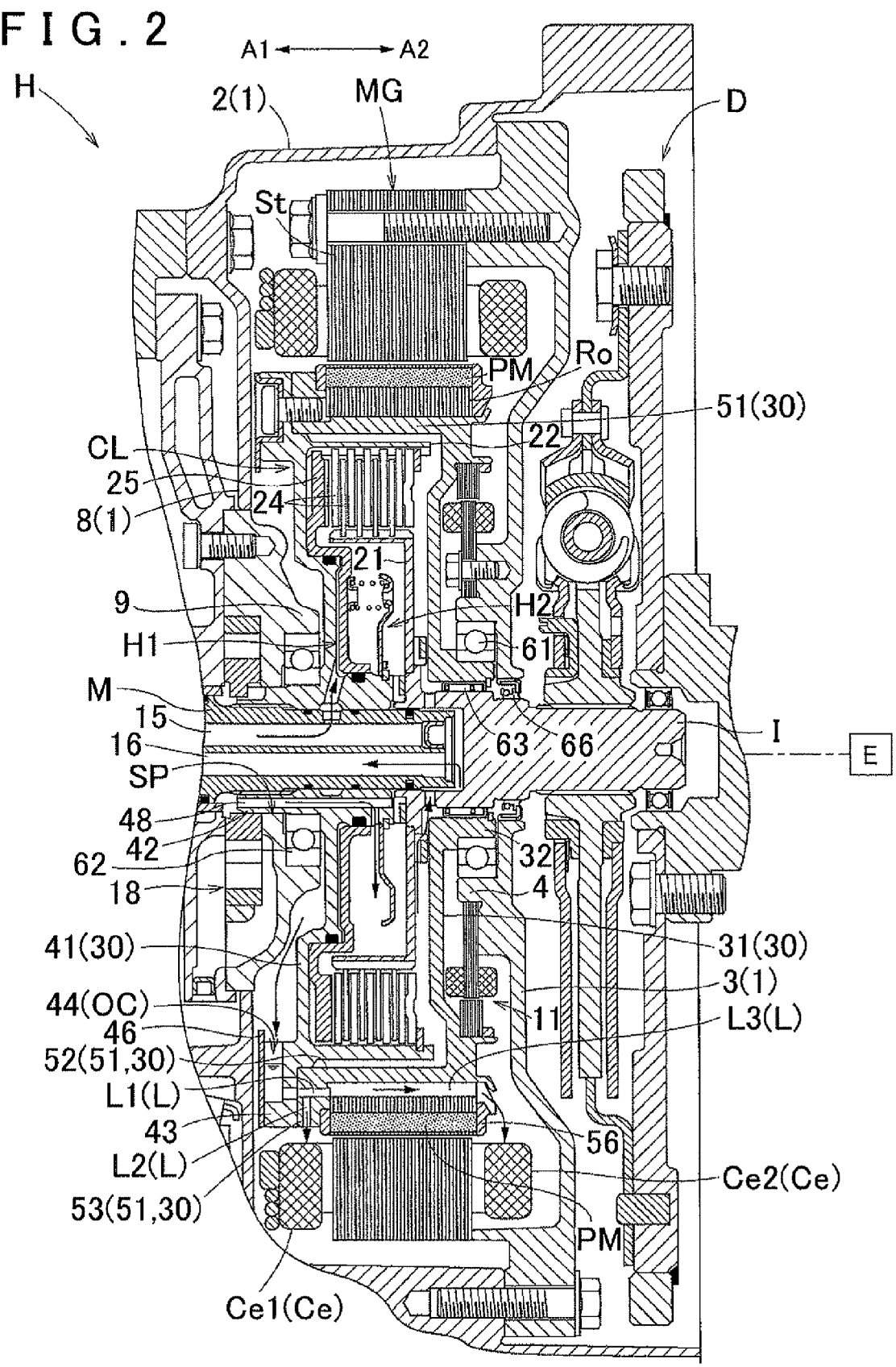
FIG. 2 is a partial cross-sectional view of the hybrid drive device of the embodiment.

The structure of each portion of the hybrid drive device H according to the present embodiment will be described below. As shown in FIG. 2, the case 1 contains at least the rotating electrical machine MG and the clutch CL. The case 1 includes: a case peripheral wall 2 that covers the outer peripheries of the components contained in the case 1 such as the rotating electrical machine MG and the speed change mechanism TM; a first support wall 3 that closes an opening of the case peripheral wall 2 on an axial second direction A2 side (the side of the internal combustion engine E, the right side in FIG. 2; the same applies to the following description); and a second support wall 8 that is placed between the rotating electrical machine MG and the speed change mechanism TM in the axial direction on an axial first direction A1 side (on the opposite side from the internal combustion engine E, the left side in FIG. 2; the same applies to the following description) with respect to the first support wall 3. Although not shown in the drawing, the case 1 further includes an end support wall that closes an end of the case peripheral wall 2 located on the other side in the axial direction.

The first support wall 3 is shaped so as to extend at least in the radial direction, and in the present embodiment, extends in the radial and circumferential directions. A through hole in the axial direction is formed in the first support wall 3, and the input shaft I, which is inserted through the through hole, is inserted into the case 1 through the first support wall 3. The first support wall 3 is coupled to a boss-shaped cylindrical portion 4 that protrudes to the axial first direction A1 side. The cylindrical portion 4 is integrally coupled to the first support wall 3. The first support wall 3 is placed on the axial second direction A2 side with respect to the rotating electrical machine MG and the clutch CL, and more specifically, is placed adjacent to a rotor support member 30, which supports the rotor Ro of the rotating electrical machine MG, on the axial second direction A2 side with a predetermined gap between the first support wall 3 and the rotor support member 30. The first support wall 3 rotatably supports the rotor support member 30 on the axial second direction A2 side of the rotating electrical machine MG.

The second support wall 8 is shaped so as to extend at least in the radial direction, and in the present embodiment, extends in the radial and circumferential directions. A through hole in the axial direction is formed in the second support wall 8, and the intermediate shaft M, which is inserted through the through hole, extends through the second support wall 8. The second support wall 8 is coupled to a boss-shaped cylindrical portion 9 that protrudes to the axial second direction A2 side. The cylindrical portion 9 is integrally coupled to the second support wall 8. The second support wall 8 is placed on the axial first direction A1 side with respect to the rotating electrical machine MG and the clutch CL, and more specifically, is placed adjacent to the rotor support member 30 on the axial first direction A1 side with a predetermined gap between the second support wall 8 and the rotor support member 30. The second support wall 8 rotatably supports the rotor support member 30 on the axial first direction A1 side of the rotating electrical machine MG. In the present embodiment, the second support wall 8 corresponds to a "support wall" in the present invention.

An oil pump 18 is accommodated in a pump chamber that is formed inside the second support wall 8. In the present embodiment, the oil pump 18 is an internal gear pump having an inner rotor and an outer rotor. The inner rotor of the oil pump 18 is spline coupled, in its radial center, to the rotor support member 30 so as to rotate together therewith. The oil pump 18 sucks oil from an oil pan (not shown) according to rotation of the rotor support member 30, and discharges the sucked oil to supply the oil to the clutch CL, the speed change mechanism TM, the rotating electrical mechanism MG, etc. Note that oil passages are formed inside the second support wall 8, the intermediate shaft M, etc., and the oil discharged from the oil pump 18 is supplied via a hydraulic control device, not shown, and the oil passages to each portion that is to be supplied with the oil. In the present embodiment, a part of the oil in the pump chamber may leak little by little in the axial direction through a gap between the through hole in the second support wall 8 and the rotor support member 30, and may be supplied to the rotating electrical machine MG. The oil thus supplied to each portion either lubricates or cools the portion, or both lubricates and cools the portion. The oil in the present embodiment functions as a "lubricating coolant" that can function both as a "lubricant" and a "coolant."

The input shaft I is a shaft member for inputting torque of the internal combustion engine E to the hybrid drive device H. The input shaft I is drivingly coupled to the internal combustion engine E at its end located on the axial second direction A2 side. The input shaft I is provided so as to extend through the first support wall 3, and as shown in FIG. 2, is drivingly coupled to the output rotating shaft of the internal combustion engine E via the damper D on the axial second direction A2 side of the first support wall 3, so as to rotate together with the output rotating shaft. A seal member 66 is provided in a region between the outer peripheral surface of the input shaft I and the inner peripheral surface of the through hole provided in the first support wall 3, in order to provide a fluid-tight seal therebetween to suppress oil leakage toward the axial second direction A2 side (the side of the damper D).

In the present embodiment, a hole, which extends in the axial direction, is formed in the radial center of an end of the input shaft I located on the axial first direction A1 side. Of the intermediate shaft M placed on the same axis as the input shaft I, an end located on the axial second direction A2 side is inserted in the axial direction into the hole. The end of the input shaft I located on the axial first direction A1 side is coupled to a clutch hub 21 extending radially outward. In the present embodiment, the rotor support member 30 is formed so as to cover the periphery of the clutch CL as described below, and a housing (a clutch housing) that accommodates the clutch CL is formed by the rotor support member 30. In this example, the housing (the clutch housing) is formed by using the entire rotor support member 30. When the term "rotor support member 30" is used in the following description, the term includes the meaning of the "housing (the clutch housing)".

The intermediate shaft M is a shaft member for inputting one or both of the torque of the rotating electrical machine MG and the torque of the internal combustion engine E via the clutch CL to the speed change mechanism TM. The intermediate shaft M is spline coupled to the rotor support member 30. As shown in FIG. 2, the intermediate shaft M is provided so as to extend through the second support wall 8. As described above, a through hole in the axial direction is formed in the radial center of the second support wall 8, and the intermediate shaft M extends through the second support wall 8 via the through hole. The intermediate shaft M is supported in the radial direction so as to be rotatable with respect to the second support wall 8. In the present embodiment, the intermediate shaft M has a plurality of oil passages therein, including a supply oil passage 15 and a discharge oil passage 16. The supply oil passage 15 extends in the axial direction, and also extends in the radial direction at a predetermined position in the axial direction so as to communicate with a hydraulic oil chamber H1 of the clutch CL, and opens in the outer peripheral surface of the intermediate shaft M. The discharge oil passage 16 extends in the axial direction, and opens in an end face of the intermediate shaft M located on the axial second direction A2 side.

Figure 3:
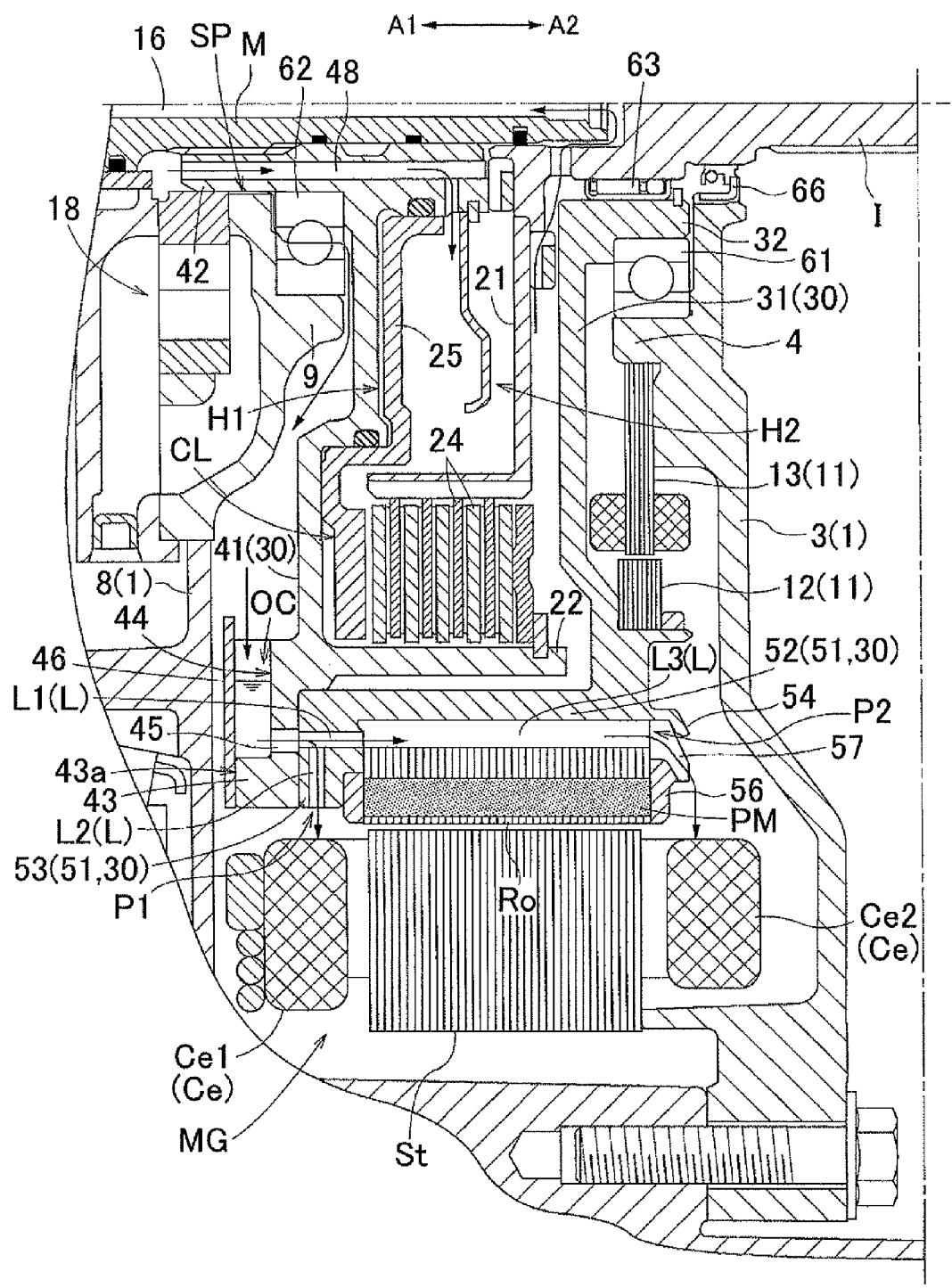
FIG. 3 is a cross-sectional view of a main portion of the hybrid drive device of the embodiment.

The clutch CL is a friction engagement device, which is provided so as to be able to switch between transmission and interruption of the driving force between the input shaft I and the intermediate shaft M as described above, and which selectively drivingly couples the internal combustion engine E to the rotating electrical machine MG. In the present embodiment, the clutch CL is structured as a wet multi-disc clutch mechanism. As shown in FIG. 3, the clutch CL includes the clutch hub 21, a clutch drum 22, a plurality of friction plates 24, and a piston 25. The clutch hub 21 is coupled to the end of the input shaft I on the axial first direction A1 side so as to rotate together with the input shaft I. The clutch drum 22 is formed integrally with the rotor support member 30, and is coupled to the intermediate shaft M via the rotor support member 30 so as to rotate together with the intermediate shaft M. The friction plates 24 are provided between the clutch hub 21 and the clutch drum 22, and have hub-side friction plates and drum-side friction plates in pairs.

In the present embodiment, the hydraulic oil chamber H1 in a fluid tight state is formed between the rotor support member 30 formed integrally with the clutch drum 22 and the piston 25. Pressure oil discharged from the oil pump 18 and adjusted to a predetermined oil pressure by the hydraulic control device (not shown) is supplied to the hydraulic oil chamber H1 through the supply oil passage 15 formed in the intermediate shaft M. Engagement and disengagement of the clutch CL are controlled according to the oil pressure supplied to the hydraulic oil chamber H1. A circulating oil chamber H2 is formed on the opposite side of the piston 25 from the hydraulic oil chamber H1. The pressure oil discharged from the oil pump 18 and adjusted to a predetermined oil pressure by the hydraulic control device (not shown) is supplied to the circulating oil chamber H2 through a circulating oil passage 48 formed in the rotor support member 30.

As shown in FIG. 2, the rotating electrical machine MG is placed radially outside the clutch CL. The rotating electrical machine MG and the clutch CL are positioned so as to have a portion overlapping each other as viewed in the radial direction. Note that regarding arrangement of two members, the expression "having an overlapping portion as viewed in a certain direction" indicates that, when the certain direction serves as a viewing direction and a viewing point is moved in each direction perpendicular to the viewing direction, the viewing point from which the two members are seen to overlap each other is present at least in some region. Arranging the rotating electrical machine MG and the clutch CL in such a positional relation reduces the length in the axial direction, whereby the overall size of the device is reduced.

The rotating electrical machine MG has the stator St fixed to the case 1, and the rotor Ro rotatably supported radially inside the stator St via the rotor support member 30. The stator St and the rotor Ro are placed so as to face each other in the radial direction with a small gap therebetween. The stator St includes a stator core, which is formed as a stacked structure formed by stacking a plurality of annular disc-shaped electromagnetic steel plates and which is fixed to the first support wall 3, and a coil that is wounded around the stator core. Note that portions of the coil, which protrude in the axial direction from the end faces of the stator located on both sides in the axial direction, serve as coil end portions Ce. In this example, of the coil end portions Ce located on both sides in the axial direction, the coil end portion Ce on the axial first direction A1 side is a first coil end portion Ce1, and the coil end portion Ce on the axial second direction A2 side is a second coil end portion Ce2. The rotor Ro of the rotating electrical machine MG includes a rotor core formed as a stacked structure formed by stacking a plurality of annular disc-shaped electromagnetic steel plates, and permanent magnets PM embedded in the rotor core. In the present embodiment, the plurality of permanent magnets PM extending in the axial direction are arranged in the rotor Ro (the rotor core) so as to be distributed in the circumferential direction.

As shown in FIGS. 2 and 3, the hybrid drive device H of the present embodiment includes the rotor support member 30 that supports the rotor Ro. The rotor support member 30 supports the rotor Ro so as to be rotatable with respect to the case 1. More specifically, the rotor support member 30 is supported by the first support wall 3 via a first bearing 61 on the axial second direction A2 side, and is supported by the second support wall 8 via a second bearing 62 on the axial first direction A1 side, with the rotor Ro fixed to the outer periphery of the rotor support member 30. The rotor support member 30 is formed so as to surround the clutch CL placed inside the rotor support member 30, that is, so as to cover the clutch CL on the axial first direction A1 side, on the axial second direction A2 side, and on the outer side in the radial direction. Thus, the rotor support member 30 has a first radially extending portion 31 placed on the axial second direction A2 side of the clutch CL and extending in the radial direction, a second radially extending portion 41 placed on the axial first direction A1 side of the clutch CL and extending in the radial direction, and an axially extending portion 51 placed radially outside the clutch CL and extending in the axial direction.

The first radially extending portion 31 is shaped to extend at least in the radial direction, and in the present embodiment, extends in the radial and circumferential directions. A through hole in the axial direction is formed in the radial center of the first radially extending portion 31, and the input shaft I inserted through the through hole extends through the first radially extending portion 31 and is inserted into the rotor support member 30. In this example, the first radially extending portion 31 is formed to have a plate shape as a whole, and is shaped so that a radially inner portion is slightly offset to the axial first direction A1 side with respect to a radially outer portion. The first radially extending portion 31 is coupled to a boss-shaped cylindrical portion 32 that protrudes to the axial second direction A2 side. The cylindrical portion 32 is integrally coupled to the first radially extending portion 31 at the radially inner end of the first radially extending portion 31. The cylindrical portion 32 is formed so as to surround the input shaft I. A third bearing 63 is provided between the cylindrical portion 32 and the input shaft I. The first bearing 61 is provided between the inner peripheral surface of the cylindrical portion 32 and the inner peripheral surface of the cylindrical portion 4 of the first support wall 3. In this example, a ball bearing is used as such a first bearing 61. The first bearing 61 and the third bearing 63 are placed so as to overlap each other as viewed in the radial direction.

The second radially extending portion 41 is shaped to extend at least in the radial direction, and in the present embodiment, extends in the radial and circumferential directions. A through hole in the axial direction is formed in the radial center of the second radially extending portion 41, and the intermediate shaft M inserted through the through hole extends through the second radially extending portion 41, and is inserted into the rotor support member 30. In this example, the second radially extending portion 41 is formed to have a plate shape as a whole, and is shaped so that a radially inner portion is slightly offset to the axial second direction A2 side with respect to a radially outer portion. The second radially extending portion 41 is coupled to a boss-shaped cylindrical portion 42 that protrudes to the axial first direction A1 side. The cylindrical portion 42 is integrally coupled to the second radially extending portion 41 at the radially inner end of the second radially extending portion 41. The cylindrical portion 42 is formed so as to surround the intermediate shaft M. A part of the axial length of the inner peripheral surface of the cylindrical portion 42 is in contact with the outer peripheral surface of the intermediate shaft M along the entire circumference. The second bearing 62 is provided in a region between the outer peripheral surface of the cylindrical portion 42 and the inner peripheral surface of the cylindrical portion 9 of the second support wall 8. In this example, a ball bearing is used as such a second bearing 62.

The cylindrical portion 42 is spline coupled to the intermediate shaft M in the inner peripheral surface of the end on the axial first direction A1 side, so as to rotate together with the intermediate shaft M. The cylindrical shaft 42 is also spline coupled to the inner rotor of the oil pump 18 in the outer peripheral surface of the end on the axial first direction A1 side, so as to rotate together with the inner rotor. The hydraulic oil chamber H1 is formed between the second radially extending portion 41 and the piston 25.

In the present embodiment, the second radially extending portion 41 has a cylindrical axially protruding portion 43 that protrudes toward the axial first direction A1 side. In this example, the axially protruding portion 43 is shaped so as to have a certain thickness in the axial and radial directions. Such an axially extending portion 43 is formed in a radially outer region of the second radially extending portion 41. A radially outer portion of the axially protruding portion 43 overlaps the rotor Ro as viewed in the axial direction. A radially inner portion of the axially protruding portion 43 overlaps the clutch drum 22 as viewed in the axial direction. The axially protruding portion 43 is placed so as to overlap the second bearing 62 and the first coil end portion Ce1 as viewed in the radial direction. In the present embodiment, oil collecting portions OC are provided in an end face 43a (see FIG. 3) of the axially protruding portion 43 located on the axial first direction A1 side. The oil collecting portions OC are provided to collect oil that is supplied from an oil supply portion SP provided on the axial first direction A1 side of the rotor Re. The oil collected by the oil collecting portions OC is supplied to the coil end portions Ce1, Ce2 on the both sides in the axial direction to cool the coil end portions Ce1, Ce2. This will be described in more detail later.

The axially extending portion 51 is shaped so as to extend at least in the axial direction, and in the present embodiment, extends in the axial and circumferential directions. The axially extending portion 51 has a cylindrical shape that surrounds the outer side in the radial direction of the clutch CL. The axially extending portion 51 couples the first radially extending portion 31 and the second radially extending portion 51 in the axial direction at their radially outer ends. In this example, the axially extending portion 51 is formed integrally with the first radially extending portion 31 on the axial second direction A2 side. The axially extending portion 51 is coupled to the second radially extending portion 41 on the axial first direction A1 side by a fastening member such as a bolt. Note that the axially extending portion 51 may be coupled to the second radially extending portion 41 by welding, etc. The rotor Ro of the rotating electrical machine MG is fixed to the outer periphery of the axially extending portion 51.

In the present embodiment, the axially extending portion 51 has a cylindrical inner support portion 52 extending in the axial direction, and an annular one-side support portion 53 extending radially outward from an end of the inner support portion 52 located on the axial first direction A1 side. In this example, the one-side support portion 53 is shaped so as to have a certain thickness in the axial and radial directions. The rotor Ro contacts and is fixed to the outer peripheral surface of the inner support portion 52, whereby the inner support portion 52 supports the rotor Ro from radially inside. The rotor Ro contacts and is fixed to an end face of the one-side support portion 53 located on the axial second direction A2 side, whereby the one-side support portion 53 supports the rotor Ro from the axial first direction A1 side. Note that an annular rotor holding member 56 is inserted with the inner support portion 52 from the axial second direction A2 side of the rotor Ro. The rotor holding member 56 is placed so as to contact the rotor Ro from the axial second direction A2 side, and holds the rotor Ro from the axial second direction A2 side. In this example, the rotor holding portion 56 presses and holds the rotor Ro from the axial second direction A2 side, with the plurality of electromagnetic steel plates held in the axial direction between the rotor holding portion 56 and the one-side support portion 53.

As described above, the rotor support member 30 of the present embodiment is structured so as to function also as the housing (the clutch housing) that accommodates the clutch CL. Most of the space formed inside the rotor support member 30 except the hydraulic oil chamber H1 serves as the circulating oil chamber H2 described above. In the present embodiment, the oil discharged from the oil pump 18 and adjusted to the predetermined oil pressure is supplied to the circulating oil chamber H2 through the circulating oil passage 48. In the present embodiment, the third bearing 63 provided between the cylindrical portion 32 of the first radially extending portion 31 and the input shaft I is a bearing having a sealing function (in this example, a needle bearing having a seal ring), which is structured so as to be able to ensure a certain level of fluid tightness. Moreover, a part of the axial length of the inner peripheral surface of the cylindrical portion 42 in the second radially extending portion 41 contacts the outer peripheral surface of the intermediate shaft M along the entire circumference. Thus, the circulating oil chamber H2 in the rotor support member 30 is made fluid-tight, and the oil is supplied to the circulating oil chamber H2, whereby the circulating oil chamber H2 is basically filled with the oil having a predetermined pressure or more. Thus, in the hybrid drive device H of the present embodiment, the plurality of friction plates 24 provided in the clutch CL can be effectively cooled by a large amount of oil filling the circulating oil chamber H2.

Note that most of the oil discharged from the circulating oil chamber H2 is discharged from the discharge oil passage 16 formed inside the intermediate shaft M, through a communication hole in the radial direction which opens in the outer peripheral surface of the input shaft I, and is returned to the oil pan (not shown). However, a part of the oil discharged from the circulating oil chamber H2 leaks in the axial direction through the third bearing 63 provided between the outer peripheral surface of the input shaft I and the inner peripheral surface of the cylindrical portion 32 of the first radially extending portion 31, and lubricates the first bearing 61 placed radially outside the third bearing 63.

In the present embodiment, a rotation sensor 11 is provided between the first support wall 3 and the first radially extending portion 31 on the axial second direction A2 side of the rotor support member 30. The rotation sensor 11 is a sensor for detecting the rotational position of the rotor Ro with respect to the stator St of the rotating electrical machine MG. For example, a resolver, etc. can be used as such a rotation sensor 11. In the present embodiment, the rotation sensor 11 is placed radially outside the first bearing 61 provided between the first support wall 3 and the first radially extending portion 31, so as to overlap the first bearing 61 as viewed in the radial direction. Moreover, the rotation sensor 11 is placed radially inside the stator St so as to overlap the second coil end portion Ce2 of the stator St as viewed in the radial direction. In this example, as shown in FIG. 3, a sensor rotor 12 is fixed to a side face of the first radially extending portion 31 located on the axial second direction A2 side, and a sensor stator 13 is fixed to a side face of the first support wall 3 located on the axial first direction A1 side. In the present embodiment, the sensor rotor 12 is placed radially inside the sensor stator 13.

3. Cooling Structure of Rotating Electrical Machine

A cooling structure of the rotating electrical machine MG of the present embodiment will be described below with reference to FIGS. 2 and 3. The rotating electrical machine MG of the present embodiment basically has a structure in which the coil end portions Ce are cooled by the oil supplied from the axial first direction A1 side of the rotor Ro. This will be described in detail below.

In the present embodiment, the oil supply portion SP for supplying oil to the rotating electrical machine MG is provided in the second support wall 8 placed on the axial first direction A1 side with respect to the rotor Ro. More specifically, the oil supply portion SP of the present embodiment is provided as a small gap between the inner peripheral surface of the through hole in the second support wall 8 and the outer peripheral surface of the cylindrical portion 42 of the second radially extending portion 41, on the axial second direction A2 side of the oil pump 18 placed inside the second support wall 8. A part of the oil in the pump chamber accommodating the oil pump 18 leaks little by little in the axial direction through the small gap as the oil supply portion SP, and lubricates the second bearing 62 placed adjacent to the oil supply portion SP (the small gap) on the axial second direction A2 side. In the present embodiment, the small gap that forms the oil supply portion SP corresponds to an "oil flowing portion" in the present invention. After lubricating the second bearing 62, the oil flows downward in the vertical direction (the lower side in FIGS. 2 and 3) along the second radially extending portion 41, and is eventually supplied to the coil end portions Ce of the rotating electrical machine MG located radially outside the rotor support member 30.

The oil collecting portions OC are provided radially outside the small gap as an oil supply portion SP and the second bearing 62 adjacent to the small gap. Such oil collecting portions OC are provided at the end of the rotor support member 30 located on the axial first direction A1 side. In the present embodiment, the oil collecting portions OC are provided at the end, located on the axial first direction A1 side, of the axially protruding portion 43 of the second radially extending portion 41 that forms a part of the rotor support member 30. More specifically, the axially protruding portion 43 is provided with recesses 44, which are shaped to be recessed to the axial second direction A2 side with respect to the end face 43a of the axially protruding portion 43 located on the axial first direction A1 side, and which open on the inner side in the radial direction. Such recesses 44 are formed so as to be evenly distributed at a plurality of (six in this example) circumferential positions in the axially protruding portion 43 (see FIG. 4). The recesses 44 are covered by a cover member 46 on the axial first direction A1 side in the state where the cover member 46 contacts and is fixed to the end face 43a of the axially protruding portion 43. The cover member 46 is fixed to the axially protruding portion 43 by fastening members such as bolts at a plurality of (18 in this example) circumferential positions. Of the cover member 46, at least the regions around the portions corresponding the recesses 44 are formed in the shape of a flat plate. Thus, a pocket-shaped space, which is closed on both sides in the axial direction, on both sides in the circumferential direction, and on the outer side in the radial direction, and opens only on the inner side in the radial direction, is formed between each recess 44 and the cover portion 46. In the present embodiment, the oil collecting portions OC are formed as the pocket-shaped spaces thus defined by the recesses 44 and the cover member 46. The oil collecting portions OC are placed so as to be evenly distributed at a plurality of (six in this example) circumferential positions corresponding to the arrangement of the recesses 44. The oil collecting portions OC are capable of collecting and storing the oil that flows downward in the vertical direction along the second radially extending portion 41 after lubricating the second bearing 62.

The rotating electrical machine MG of the present embodiment is structured so that at least the coil end portions Ce (the first coil end portion Ce1, the second coil end portion Ce2) are cooled by using the oil collected and stored by the oil collecting portions OC. Thus, the rotating electrical machine MG of the present embodiment has a communication oil passage L, which is provided in both the rotor Ro and the rotor support member 30 and which communicates, from oil collecting portion OC, with two openings (that is, a first opening P1 and a second opening P2) formed on both sides in the axial direction of the rotor Ro. An oil passage, which communicates, from the oil collecting portion OC, with the first opening P1 on the axial first direction A1 side, is formed as a part of the communication oil passage L, and the first opening P1 opens radially inside the first coil end portion Ce1. An oil passage, which communicates, from the oil collecting portion OC, with the second opening P2 on the axial second direction A2 side, is formed as another part of the communication oil passage L, and the second opening P2 opens radially inside the second coil end portion Ce2. At this time, the first opening P1 opens at a position overlapping the first coil end portion Ce1 as viewed in the radial direction, and the second opening P2 opens at a position overlapping the second coil end portion Ce2 as viewed in the radial direction.

In the present embodiment, such a communication oil passage L has a common oil passage extending from each oil collecting portion OC, an oil passage branching from the common oil passage and communicating with the first opening P1, and an oil passage branching from the common oil passage and communicating with the second opening P2. That is, in the present embodiment, the entire communication oil passage L is formed by the oil passage communicating with the first opening P1 from the oil collecting portion OC, and the oil passage communicating with the second opening P2 from the oil collecting portion OC, by using the common portion on the upstream side (the side of the oil collecting portion OC).

Figure 4:
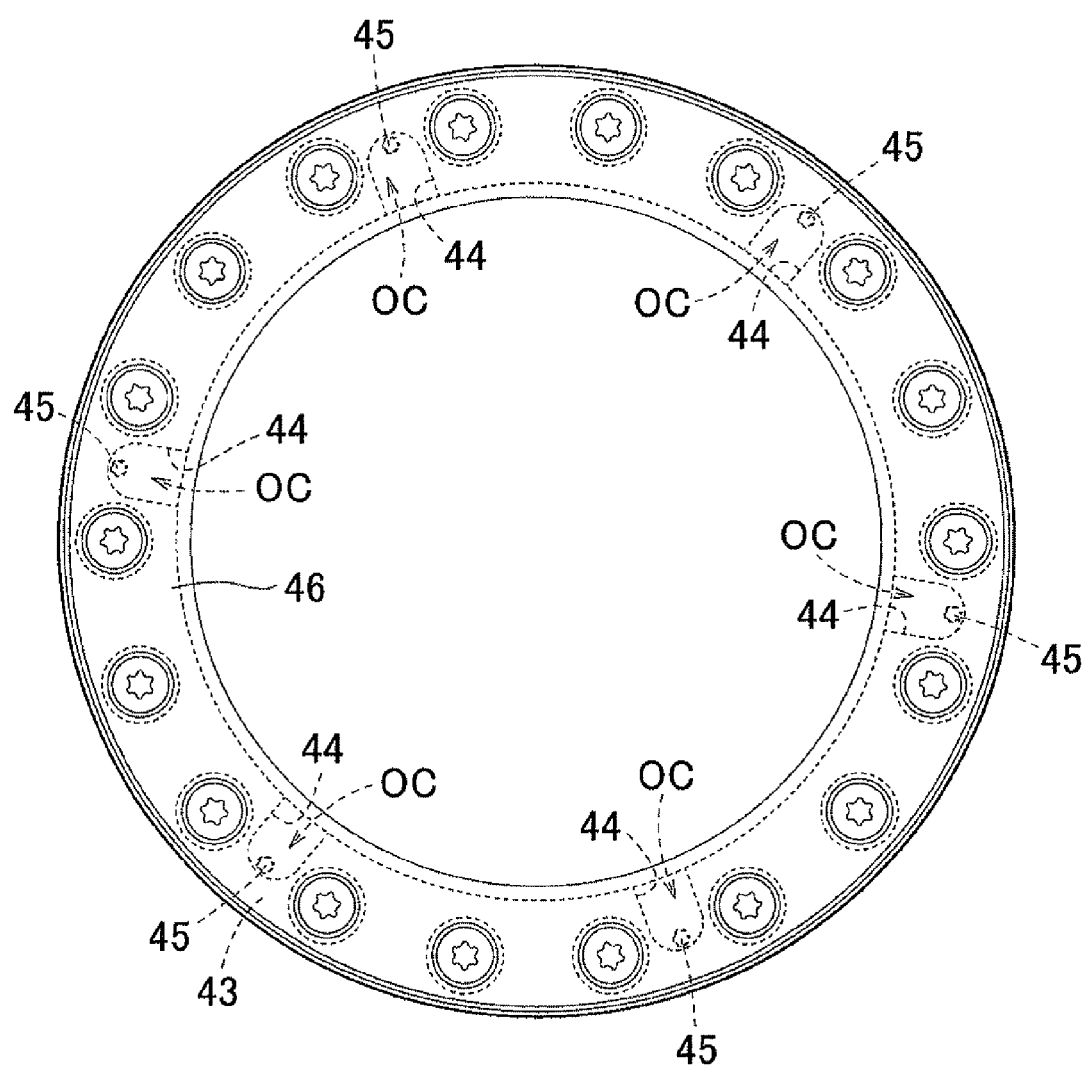
FIG. 4 is a front view when oil collecting portions of the embodiment are viewed from an axial first direction side.

More specifically, an oil hole 45 in the axial direction, which communicates with the radially outer end of the recess 44, is formed in the axially protruding portion 43 of the second radially extending portion 41, and a first oil passage L1, which communicates with the oil hole 45 and extends along the axial direction to the axial second direction A2 side, is formed in (inside) the one-side support portion 53 of the axially extending portion 51. In the present embodiment, as shown in FIG. 4, a plurality (six in this example) of the oil holes 45 and a plurality (six in this example) of the first oil passages L1 are formed so as to be distributed in the circumferential direction corresponding to the arrangement of the oil collecting portions OC (the recesses 44). The first oil passages L1 are located radially outside and adjacent to the outer peripheral surface of the inner support portion 52, and opens in the end face of the one-side support portion 53 located on the axial second direction A2 side. A second oil passage L2 branching from the first oil passage L1 and extending radially outward is formed in the one-side support portion 53. In the present embodiment, a plurality (six in this example) of the second oil passages L2 are formed so as to be distributed in the circumferential direction corresponding to the arrangement of the first oil passages L1. Each second oil passage L2 opens in the outer peripheral surface of the one-side support portion 53, and this opening serves as the first opening P1. In this example, the first opening P1 opens in directions along the radial direction. The first oil passages L1 and the second oil passages L2 can be formed in a relatively simple manner by a processing method such as drilling of the one-side support portion 53.

In the present embodiment, a third oil passage L3, which communicates with the first oil passage L1 and extends in the axial direction from the first oil passage L1 to the axial second direction A2 side, is formed in the rotor Ro along the joint surface between the outer peripheral surface of the inner support portion 52 and the inner peripheral surface of the rotor Ro. In the present embodiment, a plurality (six in this example) of the third oil passages L3 are formed so as to be distributed in the circumferential direction corresponding to the arrangement of the first oil passages L1. In the present embodiment, the radially inner portions of the electromagnetic steel plates that form the rotor Ro are cut out at a plurality of circumferential positions, and these cutouts are successively aligned in the axial direction and are fixed in this state. Thus, the third oil passages L3 are formed as axial grooves that are defined between the outer peripheral surface of the inner support portion 52 and the cutouts on the radially inner side of the electromagnetic steel plates. Each third oil passage L3 opens in the end face of the rotor Ro located on the axial second direction A2 side, and this opening serves as the second opening P2. In this example, the second opening P2 opens in the direction along the axial direction. Note that such cutouts as described above can be simultaneously formed in a punching process of the electromagnetic steel plates that form the rotor Ro.

The plurality of permanent magnets PM placed so as to be distributed in the circumferential direction in the rotor Ro generate a magnetic field for obtaining torque by interaction with a rotating magnetic field that is generated by the stator St. In the present embodiment, the third oil passages L3 are formed in the radially inner end of the rotor Ro as a joint between the rotor Ro and the inner support portion 52, which is located away from the permanent magnets PM, so that an ideal shape of a magnetic flux path as a passage of a magnetic flux by the permanent magnets PM can be maintained as much as possible without causing distortion of the magnetic flux path. Thus, even if the third oil passages L3 are formed by cutting out a part of the electromagnetic steel plates of the rotor Ro, the influence of the third oil passages L3 on the magnetic field formed by the permanent magnets PM can be reduced. Thus, since the structure of the present embodiment can suppress inhibition of formation of the magnetic field by the permanent magnets PM, it is also advantageous in that the third oil passages L3 can be formed while maintaining the capability of the rotating electrical machine MG.

Thus, in the present embodiment, the above common oil passage is formed by the oil hole 45 in the axial direction which communicates with the recess 44 defining the oil collecting portion OC, and the portion of the first oil passage L1 located on the axial first direction A1 side with respect to the branch point from which the second oil passage L2 branches. On the other hand, the oil passage branching from the common oil passage and communicating with the first opening P1 is formed by the second oil passage L2. The oil passage branching from the common passage and communicating with the second opening P2 is formed by the portion of the first oil passage L1 located on the axial second direction A2 side with respect to the branch point from which the second oil passage L2 branches, and the third oil passage L3.

In the rotating electrical machine MG having such a structure as described above, the coil end portions Ce1, Ce2 are cooled as follows. First, the oil, which leaks and is supplied in the axial direction from the oil supply portion SP between the second support wall 8 and the cylindrical portion 42 of the second radially extending portion 41 on the axial first direction A1 side, is collected by the oil collecting portion OC. The oil collected by the oil collecting portion OC is supplied from the oil collecting portion OC to the common oil passage that is formed by the oil hole 45 and a part of the first oil passage L1. A part of the oil supplied to the common oil passage is ejected from the first opening P1 through the second oil passage L2, and falls onto the first coil end portion Ce1 placed radially outside the first opening P1, thereby cooling the first coil end portion Ce1. Another part of the oil supplied to the common oil passage is ejected from the second opening P2 through the first oil passage L1 and the third oil passage L3, and falls onto the second coil end portion Ce2 placed radially outside the second opening P2, thereby cooling the second coil end portion Ce2. Note that after cooling the coil end portions Ce1, Ce2, the oil is returned to the oil pan (not shown).

In the present embodiment, the circulating oil chamber H2 in the rotor support member 30 is made fluid-tight and is basically filled with the oil having the predetermined pressure or more, in order to effectively cool the plurality of friction plates 24 included in the clutch CL. In such a structure, it is difficult to directly guide the oil in the circulating oil chamber H2 radially outward and to use this oil to cool the coil end portions Ce of the rotating electrical machine MG. Moreover, in the case where the oil supply portion SP is provided on the axial first direction A1 side of the rotating electrical machine MG, the second coil end portion Ce2, which is located on the side (the axial second direction A2 side) opposite to the side on which the oil supply portion SP is provided, may not be able to be sufficiently cooled. However, since the present embodiment uses the structure provided with the communicating oil passage L that communicates with both the first opening P1 and the second opening P2 from the oil collecting portion OC, both the first coil end portion Ce1 and the second coil end portion Ce2 can be sufficiently cooled. In particular, the structure provided with the oil collecting portion OC is used in the present embodiment. Thus, even if the amount of oil that leaks in the axial direction through the gap between the second support wall 8 and the cylindrical portion 42 of the second radially extending portion 41 is small, and the amount of oil that is supplied from the oil supply portion SP is small, the oil can be more efficiently collected by the oil collecting portion OC, and the coil end portions Ce1, Ce2 can be efficiently cooled.

In the present embodiment, the second oil passage L2 is formed so as to have substantially the same flow path cross-sectional area as that of the first oil passage L1. The third oil passage L3 is formed so as to have a flow path cross-sectional area substantially equal to or larger than those of the first oil passage L1 and the second oil passage L2. Thus, the flow rate of the oil can be made to be substantially the same in the two oil passages located downstream of the branch point from the common oil passage. Moreover, in the present embodiment, the oil collected by the oil collecting portion OC is first supplied to the common oil passage, and is then distributed and supplied to the two oil passages branching from the common oil passage. Thus, in the rotating electrical machine MG of the present embodiment, the oil supplied from the oil supply portion SP provided on the axial first direction A1 side of the rotor Ro can be evenly distributed to the two oil passages communicating with the first opening P1 and the second opening P2, regardless of the oil collection state of the oil collecting portion OC (the amount of oil stored in the oil collecting portion OC). Thus, the first coil end portion Ce1 and the second coil end portion Ce2 can be cooled in a balanced manner.

In the present embodiment, the second oil passage L2 is an oil passage extending along the radial direction, and the first opening P1 of the second oil passage L2 is formed so as to open in the center of the region occupied by the first coil end portion Ce1 in the axial direction. Thus, the entire first coil end portion Ce1 can be efficiently cooled. On the other hand, the third oil passage L3 is an oil passage extending along the axial direction, and the second opening P2 of the third oil passage L3 is formed so as to open at a position near the end face of the stator core in the region occupied by the second coil end portion Ce2 in the axial direction. As described above, the rotor holding member 56, which is inserted with the inner support portion 52 and holds the rotor Ro from the axial second direction A2 side, is provided in the present embodiment. A plurality of through holes 57, which extend at least through the rotor holding member 56 in the axial direction, are formed in the rotor holding member 56 at circumferential positions corresponding to the third oil passages L3 and the second openings P2. Each opening of the rotor holding member 56 on the axial second direction A2 side, which is formed by each through hole 57 communicating with the third oil passage L3 and the second opening P2, is formed so as to open in the center of the region occupied by the second coil end portion Ce2 in the axial direction. Thus, in the present embodiment, the entire second coil end portion Ce2 can also be efficiently cooled.

The rotor holding member 56 of the present embodiment is fixed by crimping from radially inside and from the axial second direction A2 side in the state in which the rotor holding member 56 is inserted on the inner support portion 52. That is, the rotor holding member 56 is fixed in the axial direction by a crimped portion 54 formed between the rotor holding member 56 and the inner support portion 52. The crimped portion 54 above is shaped so that the end of the cylindrical inner support portion 52 on the axial second direction A2 side is tilted radially outward toward the axial second direction A2 side. Like the crimped portion 54, each through hole 57 formed in the rotor holding member 56 is also tilted radially outward toward the axial second direction A2 side. The crimped portion 54 and the through hole 57 having such a shape function as a guide portion that guides the oil supplied from the third oil passage L3 to the second coil end portion Ce2. Thus, the second coil end portion Ce2 can be more efficiently cooled.

4. Other Embodiments

Lastly, other embodiments of the rotating electrical machine and the vehicle drive device of the present invention will be described below. Note that a characteristic structure disclosed in each of the following embodiments is not applied only in that embodiment, but may be applied in combination with the characteristic structures disclosed in the other embodiments as long as no inconsistency arises.

(1) The above embodiment is described with respect to an example in which the communicating oil passage L that communicates with the first opening P1 and the second oil passage P2 from the oil collecting portion OC is provided inside the rotor support member 30 and between the rotor Ro and the rotor support member 30. However, embodiments of the present invention are not limited to this. That is, the communicating oil passage L that communicates with the first opening P1 and the second oil passage P2 from the oil collecting portion OC need only be provided in at least one of the rotor Ro and the rotor support member 30, and as shown in, e.g., FIG. 5, the entire communication oil passage L may be formed inside the rotor support member 30. In this case, for example, the first oil passages L1 and the third oil passages L3, which are described in the above embodiment, may be formed integrally, and the position of this oil passage (representatively shown by "L3" in FIG. 5) may be shifted radially inward as compared to the position of the first oil passage L1 and the third oil passage L3 in the above embodiment. In this case, the oil passage "L3" may extend along the axial direction inside the one-side support portion 53 and the inner support portion 52, and the second opening P2 may open in the end face of the rotor support member 30 (the inner support portion 52) located on the axial second direction A2 side.

(2) The above embodiment is described with respect to an example in which each oil collecting portion OC is formed as the pocket-shaped space that is defined by covering the recesses 44, which is provided in the end face 43a of the axially protruding portion 43 of the second radially extending portion 41, on the axial first direction A1 side by the flat plate-shaped cover member 46 that contacts and is fixed to the end face 43a. However, embodiments of the present invention are not limited to this. That is, as shown in, e.g., FIG. 6, the end face 43a of the axially protruding portion 43 located on the axial first direction A1 side may be formed as a flat end face, and a plate-shaped member 47, which is shaped to protrude to the first axial direction A1 side and to open on the inner side in the radial direction, may be fixed to the end face 43a to form the oil collecting portion OC as a pocket-shaped space defined therebetween.

(3) The above embodiment is described with respect to an example in which the oil collecting portions OC are formed between the second radially extending portion 41 and the cover member 46. However, embodiments of the present invention are not limited to this. That is, for example, pocket-shaped spaces that open only on the inner side in the radial direction may be directly formed at a plurality of circumferential positions in the axially protruding portion 43 located at the end of the rotor support member 30 on the axial first direction A1 side, and these pocket-shaped spaces may be used as the oil collecting portions OC. Alternatively, an oil collecting member in which a pocket-shaped space that opens only on the inner side in the radial direction is formed may be separately provided, and this oil collecting member may be provided so as to be fixed to the end face 43a of the axially protruding portion 43 of the second radially extending portion 41.

(4) The above embodiment is described with respect to an example in which the plurality of oil collecting portions OC are placed so as to be evenly distributed at the plurality of circumferential positions. However, embodiments of the present invention are not limited to this. That is, for example, the plurality of oil collecting portions OC may be placed so as to be unevenly distributed in the circumferential direction. Alternatively, a single oil collecting portion OC that extends continuously along the entire circumference may be provided.

(5) The above embodiment is described with respect to an example in which the first opening P1 opens in a direction along the radial direction, and the second opening P2 opens in a direction along the axial direction. However, embodiments of the present invention are not limited to this. That is, regarding the first opening P1, for example, the first opening P1 may open in a direction tilted with respect to the radial direction, if the first opening P1 opens at a position overlapping the first coil end portion Ce1 as viewed at least in the radial direction. Regarding the second opening P2, for example, the second opening P2 may open in a direction tilted with respect to the axial direction or in a direction along the radial direction, if the second opening P2 opens at a position overlapping the second coil end portion Ce2 as viewed at least in the radial direction.

(6) The above embodiment is described with respect to an example in which, in the case where the third oil passage L3, which forms a part of the communication oil passage L communicating with the second opening P2 from the oil collecting portion OC, is formed in the rotor Ro, the third oil passage L3 is formed along the joint surface between the outer peripheral surface of the inner support portion 52 and the inner peripheral surface of the rotor Ro. However, embodiments of the present invention are not limited to this. That is, the third oil passages L3 may be formed in, e.g., the rotor Ro so as to extend along the axial direction between the permanent magnets PM located adjacent to each other in the circumferential direction. This structure is advantageous in that the permanent magnets PM can be cooled by the oil flowing through the third oil passage L3. Note that in this case, a leakage magnetic flux from the permanent magnets PM can be reduced by the third oil passage L3. Thus, this structure is also advantageous in that the magnetic flux distribution of the magnetic field formed by the permanent magnets PM can be made satisfactory, and high capability of the rotating electrical machine MG can be maintained.

(7) The above embodiment is described with respect to an example in which the third oil passage L3 is formed along the joint surface between the outer peripheral surface of the inner support portion 52 and the inner peripheral surface of the rotor Ro, and the third oil passage L3 is formed as a space between the axial groove formed in the inner peripheral surface of the rotor Ro and the inner support portion 52. However, embodiments of the present invention are not limited to this. That is, for example, an axial groove may be provided in the outer peripheral surface of the inner support portion 52, and the third oil passage L3 may be formed as a space between the axial groove of the inner support portion 52 and the inner peripheral surface of the rotor Ro.

Figure 5:
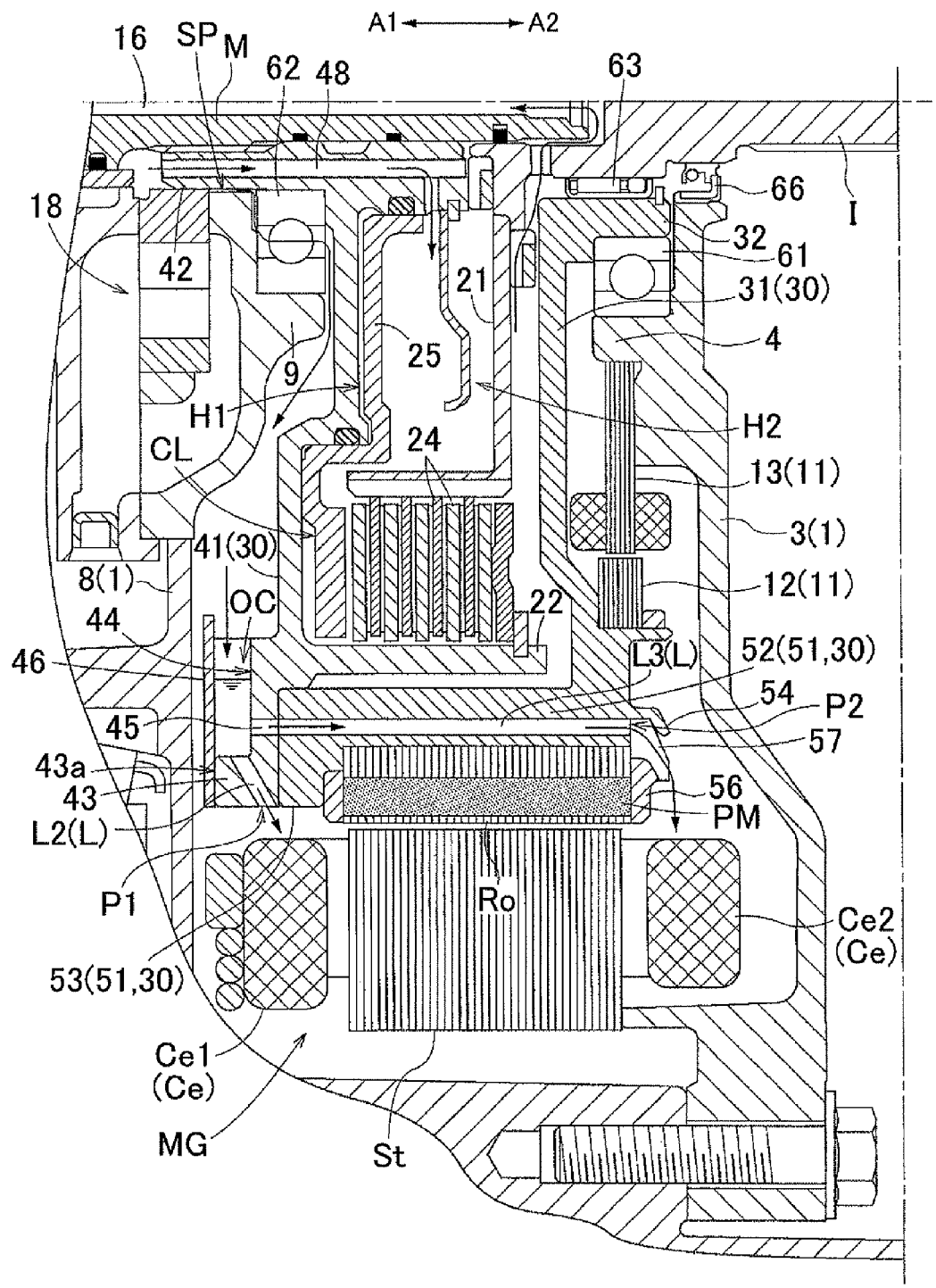
FIG. 5 is a cross-sectional view of a main portion, showing an example of a structure of pooling oil passages according to another embodiment.

(8) The above embodiment is described with respect to an example in which the communication oil passage L has the common oil passage extending from the oil collecting portion OC, and the two oil passages branching from the common oil passage and communicating with the first opening P1 and the second opening P2, respectively. However, embodiments of the present invention are not limited to this. That is, the communication oil passage L may not have such a common oil passage, but as shown in FIG. 5, independently have an oil passage communicating with the first opening P1 from the oil collecting portion OC, and an oil passage communicating with the second opening P2 from the oil collecting portion OC. In this case, the oil passage communicating with the first opening P1 from the oil collecting portion OC may extend from the radially outer bottom of the recess 44 radially outward at least in the axially protruding portion 43 of the second radially extending portion 41, and may open in the outer peripheral surface of the axially protruding portion 43 or the outer peripheral surface of the one-side support portion 53 of the axially extending portion 51. Alternatively, as shown in, e.g., FIGS. 7A and 713, at a circumferential position different from that of an oil passage (FIG. 7B) communicating with the second opening P2 from the oil collecting portion OC, an oil passage (FIG. 7A) communicating with the first opening P1 from the oil collecting portion OC may extend in (inside) the one-side support portion 53 of the axially extending portion 51 toward the axial second direction A2 side at the same radial position as that of the oil communicating with the second opening P2, and extend radially outward in the one-side support portion 53 from a predetermined position to open in the outer peripheral surface of the one-side support portion 53. Thus, the oil can be evenly distributed to the first opening P1 and the second opening P2 regardless of the oil collection state of the oil collecting portion OC.

(9) The above embodiment is described with respect to an example in which the six recesses 44, the six oil collecting portions OC, the six oil holes 45, the six first oil passages L1, the six second oil passages L2, and the six third oil passages L3 are formed. However, embodiments of the present invention are not limited to this. That is, each of the numbers of the above members may be one, two, . . . , five, seven, . . . . Note that in this case, the numbers of the above members need not necessarily be the same.

(10) The above embodiment is described with respect to an example in which the oil supply portion SP is formed as the small gap between the inner peripheral surface of the through hole in the second support wall 8 and the outer peripheral surface of the cylindrical portion 42 of the second radially extending portion 41. However, embodiments of the present invention are not limited to this. That is, in the present invention, at least the oil need only be supplied from the axial first direction A1 side of the rotor Ro, and a dedicated oil passage for supplying the oil discharged from the oil pump 18 may be provided in, e.g., the second support wall 8, and the oil supply portion SP may be formed by the dedicated oil passage.

(11) The above embodiment is described with respect to an example in which the housing (the clutch housing) is formed by the entire rotor support member 30 formed so as to surround the clutch CL. However, embodiments of the present invention are not limited to this. That is, the housing need only be formed by using at least a part of the rotor support member 30, and the housing may be formed by cooperation between the part of the rotor support member 30 and another member.

(12) The above embodiment is described with respect to an example in which the hybrid drive device H has a multi-axis structure suitable for being mounted on front-engine, front-wheel drive (FF) vehicles. However, embodiments of the present invention are not limited to this. That is, the hybrid drive device H may have a uniaxial structure in which, e.g., the output shaft of the speed change mechanism TM is coaxially arranged with the input shaft I and the intermediate shaft M, and is directly drivingly coupled to the output differential gear unit DF. The hybrid drive device H having such a structure is also suitable for being mounted on front-engine, rear-wheel drive (FR) vehicles.

(13) The above embodiment is described with respect to an example in which the vehicle drive device of the present invention is applied to the hybrid drive device H for hybrid vehicles including both the internal combustion engine E and the rotating electrical machine MG as the driving force source of the vehicle. However, embodiments of the present invention are not limited to this. That is, the present invention may also be applied to a drive device for electric vehicles (electric cars) including only the rotating electrical machine MG as the driving force source of the vehicle.

(14) The above embodiment is described with respect to an example in which the rotating electrical machine of the present invention is applied to the rotating electrical machine MG that is used as the driving force source of the vehicle. However, embodiments of the present invention are not limited to this. That is, the present invention may also be applied to the rotating electrical machine MG that is used for applications other than the application for driving the vehicle.

(15) Regarding other structures as well, the embodiments disclosed in the specification are by way of example only in all respects, and embodiments of the present invention are not limited to them. That is, it is to be understood that the configurations in which the structures that are not described in the claims are partially modified as appropriate also fall within the technical scope of the present invention, as long as the configurations include the structures described in the claims of the present application and the structures equivalent thereto.

The present invention can be used for rotating electrical machines which include a rotor rotatably supported, via a rotor support member, radially inside a stator that has coil end portions on both sides in the axial direction and which is structured so that oil is supplied from the axial first direction side, which is one side in the axial direction of the rotor, to the coil end portions on the both sides in the axial direction. The present invention can also be used for vehicle drive devices including such a rotating electrical machine.

What is claimed is:

1. A vehicle drive device, comprising:
    a rotor rotatably supported, via a rotor support member, radially inside a stator that has coil end portions on both sides in an axial direction, and which is structured so that oil is supplied from an axial first direction side, which is one side in the axial direction of the rotor, to the coil end portions on the both sides in the axial direction;
    the rotor support member is configured with a radially extending portion that extends in a radially inward direction from the rotor and is disposed radially inward from the rotor;
    an oil collecting portion provided at an end of the rotor support member located on the axial first direction side, the oil collecting portion configured to collect oil scattered from the radially inward direction of the rotor support member; and
    a communication oil passage provided in at least one of the rotor and the rotor support member, and communicating with a first opening and a second opening from the oil collecting portion, wherein
    the first opening opens radially inside the coil end portion on the axial first direction side, and
    the second opening opens radially inside the coil end portion on an axial second direction side, which is the other side in the axial direction of the rotor.

2. The vehicle drive device according to claim 1, wherein the rotor support member has a cylindrical axially protruding portion that protrudes to the axial first direction side,
    a recess is formed so as to be recessed to the axial second direction side with respect to one side end face of the axially protruding portion located on the axial first direction side and open on an inner side in a radial direction, and a cover portion is provided so as to contact and be fixed to the one side end face and cover the recess on the axial first direction side, and
    the oil collecting portion is formed as a pocket-shaped space defined by the recess and the cover member.

3. The vehicle drive device according to claim 2, wherein the communicating oil passage has a common oil passage extending from the oil collecting portion, an oil passage branching from the common oil passage and communicating with the first opening, and an oil passage branching from the common oil passage and communicating with the second opening.

4. The vehicle drive device according to claim 3, wherein the rotor support member has a cylindrical inner support portion that supports the rotor from radially inside, and an annular one-side support portion that extends radially outward from the inner support portion and supports the rotor from the axial first direction side,
    a first oil passage is formed to extend inside the one-side support portion in the axial direction from the oil collecting portion toward the axial second direction side,
    a second oil passage is formed to branch from the first oil passage and extend radially outward inside the one-side support portion, and to communicate with the first opening that opens in an outer peripheral surface of the one-side support portion, and a third oil passage is formed to extend from the first oil passage further to the axial second direction side, and communicate with the second opening that opens in an end face of the rotor or the rotor support member located on the axial second direction side.

5. The vehicle drive device according to claim 4, wherein the third oil passage is formed along a joint surface between an inner peripheral surface of the rotor and an outer peripheral surface of the inner support portion.

6. The vehicle drive device according to claim 5, further comprising:

an annular rotor holding member that is placed so as to contact the rotor from the axial second direction side, and holds the rotor from the axial second direction side; and a crimped portion that presses the rotor holding member, which is inserted with the inner support portion, from the axial second direction side, wherein the crimped portion serves as a guide portion that guides the oil, which is supplied from the third oil passage, to the coil end portion.

7. The vehicle drive device according to claim 6, wherein the communication oil passage independently has an oil passage communicating with the first opening from the oil collecting portion, and the oil passage communicating with the second opening from the oil collecting portion.

8. A vehicle drive device, comprising:
the rotating electrical machine according to claim 7;
a friction engagement device; and
a case accommodating at least the rotating electrical machine and the friction engagement device, wherein
the case has a support wall that rotatably supports the rotor support member on the axial first direction side of the rotor,
a housing that surrounds the friction engagement device is formed by using at least a part of the rotor support member, and the friction engagement device is placed in a fluid-tight state inside the housing at a position radially inside the rotor,
the housing is filled with oil at a predetermined pressure or more, and
the support wall is provided with an oil flowing portion through which the oil that is to be supplied to the coil end portions on the both sides in the axial direction flows.

9. The vehicle drive device machine according to claim 1, wherein
the communicating oil passage has a common oil passage extending from the oil collecting portion, an oil passage branching from the common oil passage and communicating with the first opening, and an oil passage branching from the common oil passage and communicating with the second opening.

10. The vehicle drive device according to claim 9, wherein the rotor support member has a cylindrical inner support portion that supports the rotor from radially inside, and an annular one-side support portion that extends radially outward from the inner support portion and supports the rotor from the axial first direction side,
a first oil passage is formed to extend inside the one-side support portion in the axial direction from the oil collecting portion toward the axial second direction side,
a second oil passage is formed to branch from the first oil passage and extend radially outward inside the one-side support portion, and to communicate with the first opening that opens in an outer peripheral surface of the one-side support portion, and a third oil passage is formed to extend from the first oil passage further to the axial second direction side, and communicate with the second opening that opens in an end face of the rotor or the rotor support member located on the axial second direction side.

11. The vehicle drive device according to claim 10, wherein
the third oil passage is formed along a joint surface between an inner peripheral surface of the rotor and an outer peripheral surface of the inner support portion.

12. The vehicle drive device according to claim 11, further comprising:

an annular rotor holding member that is placed so as to contact the rotor from the axial second direction side, and holds the rotor from the axial second direction side; and a crimped portion that presses the rotor holding member, which is inserted with the inner support portion, from the axial second direction side, wherein the crimped portion serves as a guide portion that guides the oil, which is supplied from the third oil passage, to the coil end portion.

13. The vehicle drive device according to claim 12, wherein
the communication oil passage independently has an oil passage communicating with the first opening from the oil collecting portion, and the oil passage communicating with the second opening from the oil collecting portion.

14. A vehicle drive device, comprising:
the rotating electrical machine according to claim 13;
a friction engagement device; and
a case accommodating at least the rotating electrical machine and the friction engagement device, wherein
the case has a support wall that rotatably supports the rotor support member on the axial first direction side of the rotor,
a housing that surrounds the friction engagement device is formed by using at least a part of the rotor support member, and the friction engagement device is placed in a fluid-tight state inside the housing at a position radially inside the rotor,
the housing is filled with oil at a predetermined pressure or more, and
the support wall is provided with an oil flowing portion through which the oil that is to be supplied to the coil end portions on the both sides in the axial direction flows.

15. The vehicle drive device according to claim 1, wherein
the communication oil passage independently has an oil passage communicating with the first opening from the oil collecting portion, and the oil passage communicating with the second opening from the oil collecting portion.

16. A vehicle drive device, comprising:
the rotating electrical machine according to claim 1;
a friction engagement device; and
a case accommodating at least the rotating electrical machine and the friction engagement device, wherein
the case has a support wall that rotatably supports the rotor support member on the axial first direction side of the rotor,
a housing that surrounds the friction engagement device is formed by using at least a part of the rotor support member, and the friction engagement device is placed in a fluid-tight state inside the housing at a position radially inside the rotor, the housing is filled with oil at a predetermined pressure or more, and the support wall is provided with an oil flowing portion through which the oil that is to be supplied to the coil end portions on the both sides in the axial direction flows.

17. The vehicle drive device according to claim 2, wherein the communication oil passage independently has an oil passage communicating with the first opening from the oil collecting portion, and the oil passage communicating with the second opening from the oil collecting portion.

18. A vehicle drive device, comprising:

the vehicle drive device according to claim 17;

a friction engagement device; and a case accommodating at least the rotating electrical machine and the friction engagement device, wherein the case has a support wall that rotatably supports the rotor support member on the axial first direction side of the rotor, a housing that surrounds the friction engagement device is formed by using at least a part of the rotor support member, and the friction engagement device is placed in a fluid-tight state inside the housing at a position radially inside the rotor, the housing is filled with oil at a predetermined pressure or more, and the support wall is provided with an oil flowing portion through which the oil that is to be supplied to the coil end portions on the both sides in the axial direction flows.

19. A vehicle drive device for an internal combustion engine, the vehicle drive device comprising:

a rotating electrical machine comprising:

a rotor rotatably supported, via a rotor support member, radially inside a stator that has coil end portions on both sides in an axial direction, and which is structured so that oil is supplied from an axial first direction side, which is one side in the axial direction of the rotor, to the coil end portions on the both sides in the axial direction;

an oil collecting portion provided at an end of the rotor support member located on the axial first direction side, the oil collecting portion configured to collect oil scattered from the radially inward direction of the rotor support member; and a communication oil passage provided in at least one of the rotor and the rotor support member, and communicating with a first opening and a second opening from the oil collecting portion, wherein the first opening opens radially inside the coil end portion on the axial first direction side, and the second opening opens radially inside the coil end portion on an axial second direction side, which is the other side in the axial direction of the rotor; and a clutch configured to separate coupled states between the combustion engine and the rotating electrical machine, the clutch disposed radially inward of the rotating electrical machine.

20. The vehicle drive device according to claim 1, wherein the communication oil passage further comprises:

a first oil passage portion extending in an axial direction from the oil collecting portion to the first opening;

a second oil passage portion extending in a radial direction from the oil collecting portion to the second opening, wherein the first oil passage portion and second oil passage portions are located at different circumferential positions from each other about the rotor support member.

* * * * *